May 3, 1955  W. G. CHARLEY  2,707,425
TOOL SUPPORT FOR AGRICULTURAL IMPLEMENTS
Filed Dec. 6, 1949
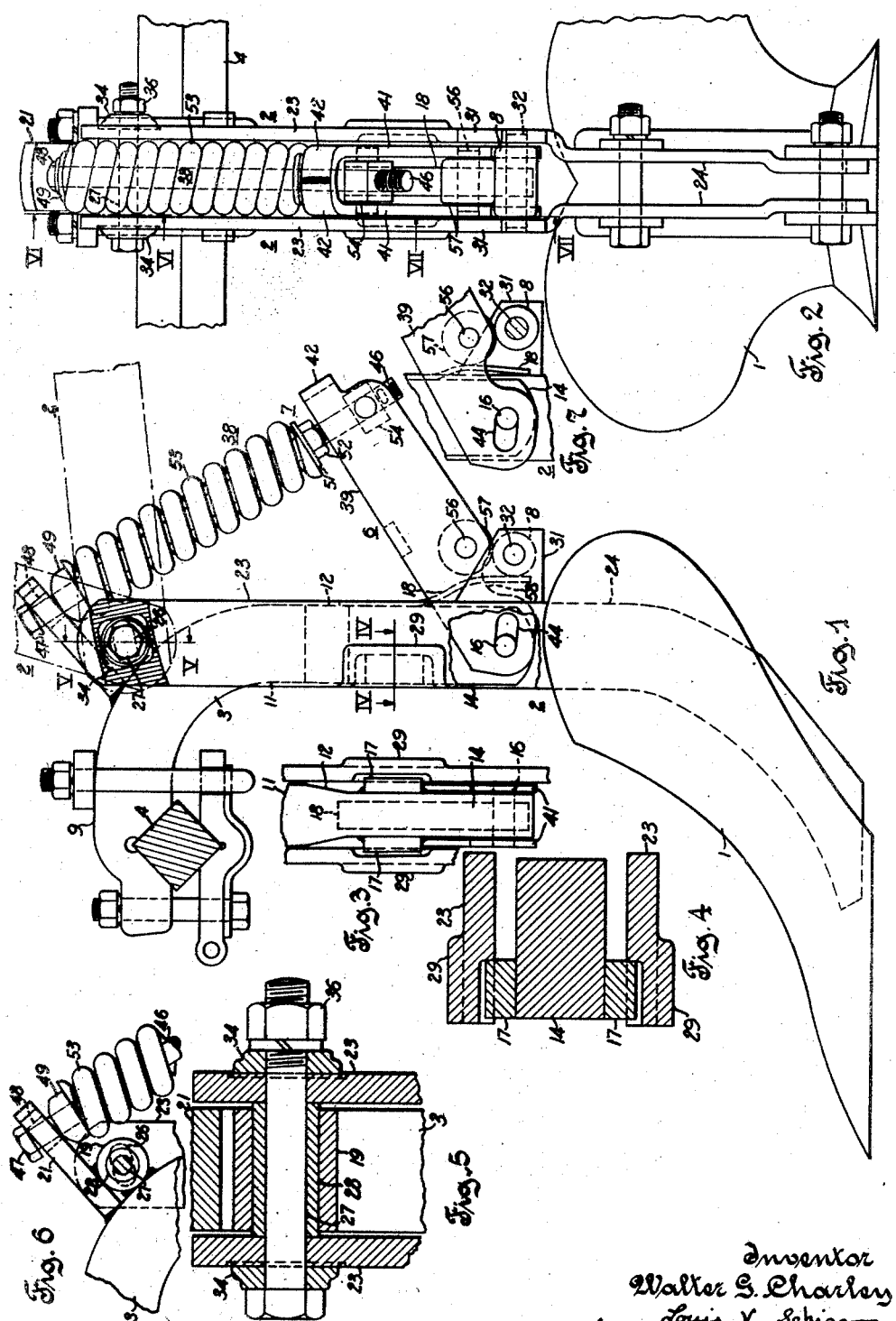
Inventor
Walter G. Charley
by Louis V. Schiavo
Attorney

United States Patent Office 2,707,425
Patented May 3, 1955

2,707,425
TOOL SUPPORT FOR AGRICULTURAL IMPLEMENTS

Walter G. Charley, La Crescent, Minn., assignor to Allis-Chalmers Manufacturing Company, Milwaukee, Wis., a corporation of Delaware Application December 6, 1949, Serial No. 131,329

14 Claims. (Cl. 97—47.89)

This invention relates to tillage implements of the type incorporating features of construction operative to free or release the ground working element or tool in the event it encounters an obstruction firmly anchored in the ground, and is more particularly concerned with the improvement of such features in a manner designed to afford a simplified construction and material advantages as to its operation.

It is common in tractor drawn tillage equipment to employ a tool mounting comprising a rigid standard, a tool carrying shank pivotally connected to and carried by the standard in depending relation thereto, and separable complementary elements additionally connecting the standard and shank and coacting therewith and with each other to releasably retain the shank in a predetermined working position. In general these known constructions utilize a fairly compact arrangement of parts affording a comparatively high ground clearance through movement of the shank rearward and upward in a vertical plane to thus clear the tool of an obstruction firmly anchored in the ground and avoid damage to the tool and other associated parts of the implement. However, these known constructions have not been entirely satisfactory in that they utilize duplicate pressure springs or other complicating parts which materially increase the cost of manufacture. In addition, the separable complementary elements of the known release devices are arranged for relative movement only in directions generally normal to one another, and consequently considerable force must be exerted by the shank in order to effect a resetting movement from nonworking to working position, which renders the resetting of the tool more difficult and subjects certain parts of the implement to unnecessary shock.

It is therefore an object of this invention to provide an implement with an improved load release mechanism which is less costly to manufacture by reason of having comparatively few parts, and which affords a high ground clearance through the use of a simplified compact structure.

Another object of the present invention is to provide an implement of this type with a simplified load release mechanism operative to minimize resistance to restoration of the shank to its normal working position after its release due to the earth working tool carried thereby encountering an obstruction.

Still another object of this invention is to provide a traveling implement with an improved release mechanism incorporating a latch member mounted for vertical swinging movement and for lost motion fore and aft relative to its support, and incorporating means acting to oppose movement of said member.

And accordingly this invention may be considered as comprising the various features of construction and/or combination affording one or more of the above stated and other objects and advantages as hereinafter more particularly pointed out in the following detailed description and appended claims, reference being had to the accompanying drawing of an illustrative apparatus, in which:

Fig. 1 is a side view of an implement embodying the invention, a part of the shank being broken away to expose the connection of the latch member with the standard;

Fig. 2 is a rear view of the implement shown in Fig. 1;

Fig. 3 is a partial front view of the implement shown in Fig. 1;

Fig. 4 is a section taken on line IV—IV of Fig. 1;

Fig. 5 is a section taken on line V—V of Fig. 1;

Fig. 6 is a section taken on line VI—VI of Fig. 2; and

Fig. 7 is a section taken on line VII—VII of Fig. 2, the latch member and roller carried thereby being shown in extreme forward position relative to the standard.

Referring now more particularly and by reference characters to the drawing, the invention is shown as employed for mounting a conventional earth working tool in the form of a middle buster share 1. The share is secured to a tool shank 2, and the latter is connected to a tool standard 3 which is supported for draft purposes from a bar 4. My improved load release mechanism, designated generally at 6, comprises a pressure rod and spring latch assembly 7 supported from the standard and a complementary element 8 supported from the shank. Obviously any type tool may be substituted for share 1, and the actual supporting member, here represented by draft bar 4, may be any suitable part of the draft appliance.

Draft bar 4 is an elongated member square in transverse cross section, and is disposed horizontally and transversely relative to the direction of travel. Tool standard 3 is rectangular in transverse cross section and comprises a horizontal section 9 which is turned downward at one end to form a vertical section 11. The horizontal section overlies draft bar 4 and forms part of a clamp for adjustably securing the standard to the draft bar, a detailed description of this clamp being omitted here as it is unnecessary to a full understanding of my invention. The vertical section is disposed to the rear of the draft bar and comprises (see Fig. 3) an intermediate portion 12 having its laterally opposite sides converging inward to form a narrow lower end portion 14, the latter portion having a transverse opening therethrough in which is fixed a pin 16 projecting laterally beyond the opposite sides thereof. Similar stop elements 17 are rigidly secured, as by welding, to opposite sides of lower end portion 14 in spaced overlying advanced relation with respect to pin 16 and in lateral alignment with respect to each other, said projections extending laterally beyond the corresponding sides surfaces of the standard proper. The upper end of a leaf spring 18 is rigidly secured, as by welding, to the upper rear face of reduced portion 14, and the lower end of this leaf spring is rearwardly offset therefrom and extends downward in spaced relation thereto.

As best shown in Fig. 6, a tubular bearing sleeve 19 having a length equal to the width of standard 3 is rigidly secured, as by welding, to the back of the standard where the horizontal section 9 thereof turns down to form the vertical section 11, said sleeve being horizontally transversely disposed in overlying vertical alignment with pin 16. A spring mounting bracket comprising a plate member 21 having a width equal to the width of standard 3 and to the length of sleeve 19 is rigidly secured, as by welding, to the upper side of standard 3 and sleeve 19 and is disposed thereby to extend upwardly and rearwardly therefrom in overhanging relation to sleeve 19.

The tool shank 2 comprises (see Fig. 2) a pair of similar, rigidly joined parts or bar members having upper and lower sections 23 and 24, respectively. The lower sections mount middle buster share 1 in a conventional manner. The upper sections are transversely spaced and are normally disposed on opposite sides of vertical section 11 of standard 3. A pair of aligned openings 26 in opposed upper end portions of sections 23 receive a pivot bolt 27 which is mounted in a tubular bushing 28, the latter being mounted for free pivotal movement in tubular bearing sleeve 19. Bushing 28 is disposed between sections 23, and its length is greater than that of bearing sleeve 19 so that the inner faces of sections 23 are spaced slightly from the sides of standard 3 to allow free rearward and upward swinging movement of shank 2 and middle buster share 1 in a vertical plane. Intermediate forward edge portions 29 of sections 23 are outwardly offset to receive stop elements 17, the latter normally coacting with the shoulder portions thus formed to limit forward swinging movement of shank 2 and middle buster share 1 relative to the standard 3.

A pair of similar plate brackets 31 are rigidly secured, as by welding, to the rear lower edges of sections 23 and extend rearwardly therefrom in transverse alignment. A pivot pin 32, rotatably mounting the complementary element or latch means comprising a roller 8, is rigidly secured, as by welding, to opposed portions of brackets 31, the roller being thereby disposed between the brackets and normally in rearward close adjacent relation to the lower end of leaf spring 18. It will be noted that openings 26 are elongated and struck on an arc centered at the axis of pivot pin 32. And it will also be noted that a pair of serrated washers 34 are interposed between sections 23 and the head of pivot bolt 27 and the nut 36 threaded on this bolt, respectively, and that a plurality of complementary serrations on the outer faces of sections 23 are disposed parallel to a line through the axes of pivot pin 32 and pivot bolt 27, this construction affording a beaming adjustment of the shank as hereinafter more fully set forth.

My pressure rod and spring latch assembly comprises a pressure rod and spring device 38 and a latch member 39. The latter includes a pair of laterally spaced similar plate members 41 having rear end portions 42 of reduced width which are turned inward and rigidly secured together, as by welding, to form a U-shaped member, the open end of which is disposed to straddle the lower extremity of portion 14 of standard 3. Opposed forward portions of plate members 41, near the open end of latch member 39, are provided with a pair of laterally aligned openings 44 receiving the opposite end portions of pin 16 and thereby affording vertical swinging movement of the latch member relative to standard 3. Plate member 21 supports a guide element or rod 46 having a head 47 formed at its upper end, this rod slidably extending downward through an oversized opening 48 in plate member 21 and having its opposite end externally threaded. A washer 49 which is provided with opposite facing flat and rounded faces is slidably mounted on rod 46 with the rounded face next to plate member 21 and the flat face in opposed spaced relation to a flat washer 51 mounted on the threaded end of the rod and secured thereon by a nut 52. Yieldable means comprising coil compression spring 53 surrounds rod 46 in position to react between washers 49 and 51 and normally retain the head 47 of rod 46 engaged with the upper surface of plate 21. The lower extremity of rod 46 is threaded into a rotatable connecting means or trunnion 54 which is pivotally mounted in opposed portions of plate members 41 near the closed end of the latch member formed thereby for rotation about a horizontal transverse axis. The length of rod 46 is such that latch member 39 is disposed to extend rearward and upward from pivot pin 16, and the distance between the latter and trunnion 54 is such that rod 46 is normally positioned at an acute angle with plate member 21 so that washer 49 bears eccentrically on this plate, i. e., bears only on a portion of plate 21 forward of the axis of rod 46 so that spring 53 acts to urge this rod rearward and upward toward a position wherein the axis of rod 46 is normal to plate 21. It will be noted that openings 44 are elongated and are normally disposed to extend rearward and downward from fixed pivot pin 16 with the latter engaging the forward ends of these slots, this relation being normally maintained by the above described rod biasing action of spring 53. Stated differently, spring 53 exerts a minor force which acts generally at a right angle to the axis of the rod 46 and tends to move the member 38 rearwardly relative to the pin 16. In addition, a pivot pin 56 rotatably mounting a roller 57 is rigidly secured, as by welding, to opposed intermediate portions of plate members 41, roller 57 being disposed therebetween and normally in contact with, and in upward rearward relation to the latch element or roller 8, the distance between the axes of pivot bolt 27 and pivot pin 32 being less than the sum of the distances between the axes of pivot bolt 27 and pivot pin 56 and between the axes of the latter and pivot pin 32. Also, it will be noted that the lower edge portions of plate members 41 are shaped, as at 58, so that these members clear roller 8, which is less in diameter than roller 57.

In operation, with middle buster share 1 in normal working position, as shown in Fig. 1, the relative disposition of rollers 8 and 57 or other suitable elements or portions is as stated above, and roller 57 will resist any rearward and upward (break-back) swinging movement of the shank and share in a vertical plane under normal working pressures encountered by the share as it moves through the ground. However, when the share meets with an unyielding obstruction the rearward force exerted on roller 57 by roller 8 will be greatly increased, as will be evident, and as a result the relative disposition of these rollers will be changed. During its initial rearward movement, roller 8 passes under roller 57 in contact therewith and simultaneously forces the latter upward until roller 8 passes rearward therebeneath. Roller 57 then moves downward under the action of spring 53 and assumes its initial position, roller 8 continuing to move rearward and upward relative to roller 57. The initial movement of roller 57 causes latch member 39 to swing upward about the axis of pivot pin 16, this upward movement further compressing spring 53 and moving the head 47 of rod 46 upward relative to the top side of plate 21. In other words, swinging movement of the member 39 about the pin 16 is resisted by a major force of the spring 53 which acts axially of the rod 46 and generally at a right angle to the minor force which tends to move member 39 bodily rearwardly. Of course, as this spring is compressed, rod 46 slides upward through oversized opening 48 in plate member 21, angular displacement of the pressure rod and spring device 38 relative to latch member 39 being afforded by trunnion 54, which, as stated above, is mounted to pivot about a horizontal transverse axis. The said continuing rearward and upward movement of roller 8 places it out of contact with roller 57, and the shank members swing rearward past opposite sides of the latch member 39 and of the pressure rod and spring device 38. The length of rod 46 and the disposition of latch member 39 is such that roller 8 clears these parts as it swings rearward and upward with the shank, this swinging movement being at least sufficient so that share 1 will clear any obstruction which will pass under standard 3. Several nonworking break-back positions which may be assumed by shank 2 are indicated by dash dotted lines in Fig. 1.

After the share has passed the obstruction, draft bar 4 is raised, and the weight of the share causes it to swing forward again toward working position. Initial forward and downward movement again places roller 8 in contact with roller 57 and in rearward lower relation thereto. It will be observed that latch member 39 is arranged for swinging movement about the horizontal transverse axis of trunnion 54 and is capable of forward and upward movement afforded by the elongated openings 44 which receive fixed pin 16 and decline rearwardly therefrom. Consequently, further forward movement of roller 8 causes movement of latch member 39 and roller 57 forward and upward against the rod biasing action afforded by spring 53 by reason of the eccentric bearing of washer 49 on plate 21, as previously described. And a further movement in this direction is additionally resisted by the engagement of roller 57 with leaf spring 18, forward movement of the shank being limited by its engagement with stop elements 17. As roller 8 approaches its normal position the rod biasing action afforded by spring 53 by reason of the eccentric bearing of washer 49 on plate 21 causes movement of latch member 39 and roller 57 rearward and downward from the position shown in Fig. 7 to its normal latched position shown in Fig. 1, roller 57 moving over roller 8 in contact therewith in arriving at this position. In other words, the forward end of latch member 39 has a lost motion (pin and slot) connection with the support (bar 4 and standard 3) which enables the latch member to swing about a pivot axis transverse to the direction of break-back movement and to bodily move fore and aft a limited extent in said direction.

The angle which the share makes relative to the ground may be adjusted by loosening nut 36 enough to free washers 34 from serrations 37 on shank sections 23 and angularly adjusting the shank, about the axis of roller 8, to a selected position within the limits afforded by elongated openings 26, whereupon the nut 36 is again tightened to retain the selected adjustment. And it will be evident that this adjustment is made without disturbing the setting of the release mechanism. Also, rod 46 may be turned in trunnion 54 for adjusting the position of the rear end of latch member 39 along the longitudinal axis of the rod. And it will be observed that in making such an adjustment the vertical position of roller 57 is likewise changed relative to roller 8, thus making the release mechanism more or less difficult to trip. In order to prevent rattling of the parts leaf spring 18 is normally disposed to urge roller 8 rearward into contact with roller 57 throughout the latter's range of vertically adjusted movement. Share 1 having been returned to working position, draft bar 4 may again be lowered to permit the share to enter the ground.

It should now be apparent that a release device has been provided which incorporates a single pressure spring, and which by reason of having comparatively few parts is easier and cheaper to manufacture. And it will be observed that the general organization of parts results in a compact structure affording a maximum of ground clearance because the full length of the tool standard is utilized in mounting the release device. Also, shock and resistance to restoration of the shank to working position are reduced because the general organization of parts permits this restoration without the necessity of materially compressing the pressure spring beyond the amount selected for the initial setting thereof. And finally, it will be observed that the pressure spring has been mounted in a manner opposing a swinging movement of the latch member as well as a bodily fore and aft movement thereof.

It should be obvious that although the apparatus herein disclosed as embodying the invention has particular utility in the construction of tillage implements, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. In an implement having a tool mounting comprising a vertically depending standard, a pair of laterally spaced shank parts supported adjacent opposite sides of said standard for vertical swinging movement rearward and upward relative thereto, and having an earth working tool carried by said shank parts for swinging movement therewith, an improved compact load release mechanism comprising a pressure rod and spring latch assembly including a latch member pivotally connected to said standard for relative vertical swinging movement, rotatable connecting means on said members in spaced relation to said connection to the standard, elongated spring means reacting against said standard and engaging said rotatable connecting means, and a roller on said latch member disposed intermediate said standard and rotatable means, said spring means being adjustable in said rotatable means to afford vertical selective positioning of said latch roller, and said assembly being positioned in vertical rearward alignment with said standard, and a complementary roller on said shank parts positioned in underslung relation to said latch assembly and coactively engageable with said latch roller to releasably prevent a rearward and upward swinging movement of said shank parts relative to said standard, the parts of said latch assembly to the rear of said latch roller being positioned so that for any adjusted position of said spring means in said rotatable means said complementary roller may swing freely past in moving rearward and upward with said shank parts relative to said standard, and additional spring means on the standard normally acting to urge said complementary roller rearward into engagement with said latch roller.

2. In an implement having a main support and a depending tool carrying part pivotally mounted on said support to swing rearward and upward relative to a normal working position, an improved release mechanism comprising a latch element carried by said part for movement therewith, an elongated latch member presenting a forward portion having a lost motion connection with said support affording vertical swinging movement of said latch member about a transverse pivot axis and also a limited fore and aft bodily movement of said latch member relative to said support, said latch member extending rearward from said pivot axis and presenting an intermediate portion disposed in overlying releasable engagement with said element when said part is in its normal working position, and yieldable means reacting against said support and including a guide element swingably supporting a rear portion of said member, said yieldable means being operatively associated with said support and with said rear portion of said member to exert a major force which acts on said member in a direction generally normal to and resisting said swinging of said member about said axis, and to simultaneously exert a minor force acting in a direction generally at a right angle to the direction of action of said major force to maintain the latter in its aftmost position relative to said support.

3. In an implement having a main support and a depending tool carrying part mounted on a transverse pivot means on said support to swing rearward and upward relative to a normal working position, an improved release mechanism comprising a latch element mounted in rearwardly disposed relation on said part for movement therewith, an elongated latch member presenting a forward portion having a pin and slot connection with a portion of said support spaced vertically beneath said transverse pivot means and in advance of said latch element, said pin and slot connection affording vertical swinging movement of said latch member about a transverse pivot axis and also a limited fore and aft movement of said latch member relative to said support, said latch member extending upward and rearward and presenting an intermediate portion disposed in overlying releasable engagement with said element when said part is in its normal working position, and yieldable means reacting against said support and including a guide element swingably mounting a rear portion of said latch member for limited movement along a predetermined path, said yieldable means being operatively mounted to exert a major force resisting an upward vertical swinging movement of said latch member about said pivot axis and a minor force normally operative to maintain said latch member in its aftmost position relative to said support.

4. In an implement having a main support and a depending tool carrying part mounted on a transverse pivot means on said support to swing rearward and upward relative to a normal working position, an improved release mechanism comprising a latch element mounted in rearwardly disposed relation on said part for movement therewith, an elongated latch member presenting a forward portion having a lost motion connection with a portion of said support disposed vertically beneath said transverse pivot means and in advance of said latch element, said lost motion connection affording vertical swinging movement of said latch member about a transverse pivot axis and also a limited fore and aft movement of said latch member relative to said support, said latch member extending upward and rearward and presenting an intermediate portion disposed in overlying releasable engagement with said element when said part is in its normal working position, and a compression spring reacting against said support and including a retaining element pivotally supporting a rear portion of said latch member for limited movement along an arc having a predetermined center spaced from said pivot axis, said spring being operatively mounted to exert only a slight force normally operative to maintain said latch member in its aftmost position relative to said support and yet be operative to oppose an upward swinging movement of said latch member with substantially the full force of said spring.

5. In an implement having a vertically disposed main support and a depending tool carrying part mounted on a transverse pivot means on said support to swing rearward and upward relative to a normal working position, said depending part having a portion extending to the rear of said support, an improved release mechanism comprising a first latch element mounted on said portion of said part for rotation about a transverse axis disposed to the rear of said support and below said transverse pivot means, a latch member extending rearward from said support and presenting a forward portion having a pin and slot connection with a portion of said support disposed below said transverse pivot means and above said first latch element, said pin and slot connection affording vertical swinging and limited fore and aft movement of said latch member relative to said support, a second latch element mounted on a portion of said latch member intermediate the ends thereof for rotation about a transverse axis and being disposed in overlying releasable engagement with said first latch element when said part is in its normal working position, the sum of the distances between said elements and between said second element and said transverse pivot means exceeding the distance between said pivot means and said first element, and yieldable means mounted to pivotally react against said support and including a guide element swingably supporting a rear portion of said latch member for limited movement along a predetermined path, said yieldable means being operatively associated with said rear portion of said member so as to exert a major force resisting upward vertical swinging movement of said latch member about said pivot axis and a minor force normally operative to maintain said latch member in its aftmost position relative to said support.

6. In an implement having a main support presenting a pair of vertically spaced pivot elements having fixed transverse axes, and a depending tool carrying part operatively mounted on the upper one of said pivot elements for swinging movement rearward and upward relative to a normal working position, said depending part extending below said support and presenting a portion disposed to the rear of the former, an improved release mechanism comprising a first latch roller mounted on said portion of said part for rotation about a transverse axis disposed to the rear of said lower pivot element and below said first pivot element, a rearwardly extending latch member presenting a forward portion having an elongated opening pivotally and slidably receiving said lower pivot element to afford vertical swinging and limited fore and aft movements of said latch member relative to said support, a second latch roller carried by a portion of said latch member intermediate the ends thereof for rotation about a transverse axis and being disposed in overlying releasable engagement with said first latch roller when said part is in its normal working position, said opening being inclined to the horizontal so as to effect an upward movement of the forward end of said latch member and thereby of said second roller as the former moves forward from its aftmost position relative to said support, and yieldable means mounted to pivotally react against said support and including a guide element pivotally supporting a rear portion of said latch member for limited movement along an arc having a center generally coincident with the point of pivotal reaction between said yieldable means and said support, said yieldable means being operatively associated with said rear portion to exert a major force resisting an upward vertical swinging movement of said latch member about said pivot axis and a minor force normally operative to maintain said latch element in its aftmost position relative to said support.

7. In an implement having a main support and a depending tool carrying part mounted on an upper transverse pivot means on said support to swing rearward and upward relative to a normal working position, said support presenting a lower transverse pivot means disposed intermediate the ends of said depending part, an improved release mechanism comprising a latch element carried by said part for movement therewith, an elongated latch member presenting a forward portion provided with an elongated opening pivotally and slidably receiving said lower transverse pivot means to afford vertical swinging movement of said latch member about a transverse pivot axis and also a limited fore and aft movement of said latch member relative to said support, said latch member extending rearward from said lower transverse pivot means and presenting an intermediate portion disposed in overlying releasable engagement with said element when said part is in its normal working position, an elongated element having opposite end portions thereof pivotally connected respectively to said standard and a rear portion of said latch member, said elongated element pivotally supporting said rear portion of said latch member for limited movement along an arc having a predetermined center spaced from said pivot axis, and a compression spring arranged on said elongated element to react eccentrically against said standard and exert only a slight force normally operative to maintain said latch member in its aftmost position relative to said support and yet oppose an upward swinging movement of said latch member with substantially the full force of said spring.

8. In an implement having a vertically disposed main support and a depending tool carrying part supported on a transverse pivot mounting carried by said support and affording a rearward and upward swinging movement of said part relative to a normal working position, an improved release mechanism comprising a latch element mounted in rearwardly disposed relation on said part for movement therewith, an elongated latch member presenting a forward portion having a lost motion connection with said support affording vertical swinging movement of said latch member about a transverse pivot axis and also a limited fore and aft movement of said latch member relative to said support, said latch member extending rearward from said support and presenting an intermediate portion disposed in overlying releasable engagement with said element when said part is in its normal working position, and yieldable means reacting against said support and including an element swingably supporting a rear portion of said latch member for limited movement along a predetermined path, said yieldable means being operatively associated with said rear portion to exert a major force thereon resisting an upward vertical swinging movement of said latch member about said pivot axis and a minor force normally operative to maintain said latch member in its aftmost position relative to said support, said yieldable means and latch member being disposed in rearward vertical alignment to said support and lying freely within the arcuate path traveled by said latch element as said part swings rearward and upward relative to said support.

9. In an implement having a tool mounting comprising a vertically depending standard, a pair of laterally spaced shank parts supported adjacent opposite sides of said standard on transverse pivot mountings carried by the latter and affording vertical swinging movement of said shank parts rearward and upward relative to the standard, said shank parts extending below said standard and having an earth working tool carried by said shank parts for swinging movement therewith, an improved compact load release mechanism comprising a latch element mounted in rearward intermediate relation to lower portions of said shank parts for movement therewith, an elongated latch member presenting a forward portion freely disposed between said shank parts and having a lost motion connected with a lower portion of said standard affording vertical swinging movement of said latch member about a transverse pivot axis and also a limited fore and aft movement of said latch member relative to said standard, said latch part extending rearward from said standard and presenting an intermediate portion disposed in overlying releasable engagement with said element when said shank parts are in their normal working position, and yieldable means pivotally supporting a rear portion of said latch member and being operatively associated with said standard to exert a major force resisting an upward swinging movement of said latch member and a minor force normally operative to maintain said latch member in its aftmost position relative to said standard, said latch member and yieldable means having an overall width less than the lateral spacing of said shank parts and being disposed in rearward vertical alignment to said standard and lying freely within the arcuate path traveled by said latch element as said shank parts swing rearward and upward relative to the standard.

10. In an implement having a tool mounting comprising a vertically depending standard, a pair of laterally spaced shank parts supported adjacent opposite sides of said standard for vertical swinging movement rearward and upward relative thereto, and having an earth working tool carried by said shank parts for swinging movement therewith, an improved compact load release mechanism comprising a pressure rod and spring latch assembly including a latch member pivotally connected to said standard for relative vertical swinging movement, rotatable connecting means on said member in spaced relation to said connection to the standard, elongated spring means reacting against said standard and engaging said rotatable connecting means, and a roller on said latch member disposed intermediate said standard and rotatable means, said assembly being positoned in vertical rearward alignment with said standard, and a complementary roller on said shank parts positioned in underslung relation to said latch assembly and coactively engageable with said latch roller to releasably prevent a rearward and upward swinging movement of said shank parts relative to said standard, the parts of said latch assembly to the rear of said latch roller lying freely within the arcuate path traveled by said complementary roller as said shank parts swing rearward and upward relative to said standard, and additional spring means on the standard normally acting to urge said complementary roller rearward into engagement with said latch roller.

11. In an implement having a main support and an extending tool carrying part pivotally mounted on said support for break-back swinging movement relative to a normal working position, an improved mechanism releasably retaining said part in its said position and comprising: a latch element carried by said part for movement therewith; a latch member presenting a first portion having a lost motion connection with said support enabling said member to swing about a pivot axis transverse to the direction of said break-back movement and to bodily move a limited extent in a direction transverse to said axis, said member presenting a latch element engaging portion disposed in releasable contact with said element when said part is in its said normal working position; and yieldable means reacting against said support and including a guide element swingably supporting a second portion of said member, which is spaced from said first portion in a direction said member moves bodily relative to said axis, said yieldable means being operatively associated with said support and with said second portion of said member to exert a major force which acts on said member in a direction generally normal to and resisting said swinging of said member about said axis, and to simultaneously exert a minor force acting on said member in a direction generally at a right angle to the direction of action of said major force resisting movement of said member in a direction opposite to said break-back movement.

12. In an implement having a main support and an extending tool carrying part pivotally mounted on said support for break-back swinging movement relative to a normal working position, an improved mechanism releasably retaining said part in its said position and comprising: a latch element carried by said part for movement therewith; a latch member presenting a first portion having a lost motion connection with said support enabling said member to swing about a pivot axis transverse to the direction of break-back movement and to bodily move a limited extent in a direction transverse to said axis, said member presenting a latch element engaging portion disposed in releasable contact with said element when said part is in its said normal working position; a single yieldable means reacting against said support and including a guide element pivotally supporting a second portion of said member, which is spaced from said first portion, for limited movement along an arc having a predetermined center spaced from said pivot axis, said single yieldable means being operatively associated with said second portion of said member and with said support to exert a major force on said member in a direction normal to and resisting said swinging of said member about said axis and to simultaneously exert a minor force acting on said member in a direction generally at a right angle to the direction of action of said major force resisting movement of said member in a direction opposite to said break-back movement.

13. In an implement having a main support and an extending tool carrying part pivotally mounted on said support for break-back swinging movement in a fore and aft direction relative to a normal working position, an improved mechanism releasably retaining said part in its said position and comprising: a latch element carried by said part for movement therewith; a latch member presenting a first portion having a pin and slot connection with said support wherein said pin affords swinging movement of said member about a pivot axis transverse to the direction of said break-back movement and wherein said slot extends in said fore and aft direction with the fore end of the slot being nearer to the pivot mounting for said part than is the aft end thereof, said member presenting a latch element engaging portion disposed in releasable contact with said element when said part is in its normal working position; and yieldable means reacting against said support and including a guide element swingably supporting a second portion of said member, said yieldable means being operatively associated with said support and with said second portion of said member to exert a major force which acts in a direction generally normal to and resisting said swinging of said member about said axis, and to simultaneously exert a minor force acting in a direction generally at a right angle to the direction of action of said major force to maintain said member in its aftmost position relative to said support.

14. In an implement having a main support and an extending tool carrying part pivotally mounted on said support for break-back swinging movement relative to a normal working position, an improved mechanism releasably retaining said part in its said position and comprising: a latch element carried by said part for movement therewith; a latch member presenting a first portion having a pin and slot lost motion connection with said support enabling said member to swing about a pivot axis transverse to the direction of said break-back movement and to bodily move a limited extent in said direction of break-back movement, said member presenting a latch element engaging portion disposed in releasable contact with said element when said part is in its normal working position, and yieldable means reacting against said support and including an elongated guide element swingably supporting a second portion of said member which is spaced from said first portion, said yieldable means being operatively associated with said support and with said second portion of said member to exert a major force acting generally longitudinally of said guide element to resist said swinging movement of said member and to exert a minor force acting transversely of said guide element to resist movement of said member in a direction opposite to the direction of said break-back movement.

References Cited in the file of this patent

UNITED STATES PATENTS

| | | |
|---|---|---|
| 894,787 | Waterman | July 28, 1908 |
| 1,808,477 | Printz | June 2, 1931 |
| 2,312,405 | Haagen | Mar. 2, 1943 |
| 2,331,686 | Hintz | Oct. 12, 1943 |

FOREIGN PATENTS

| | | |
|---|---|---|
| 13,740/28 | Australia | Apr. 16, 1929 |
| 90,517 | Sweden | Oct. 12, 1937 |
| 90,883 | Sweden | Nov. 23, 1937 |